United States Patent Office 3,152,872
Patented Oct. 13, 1964

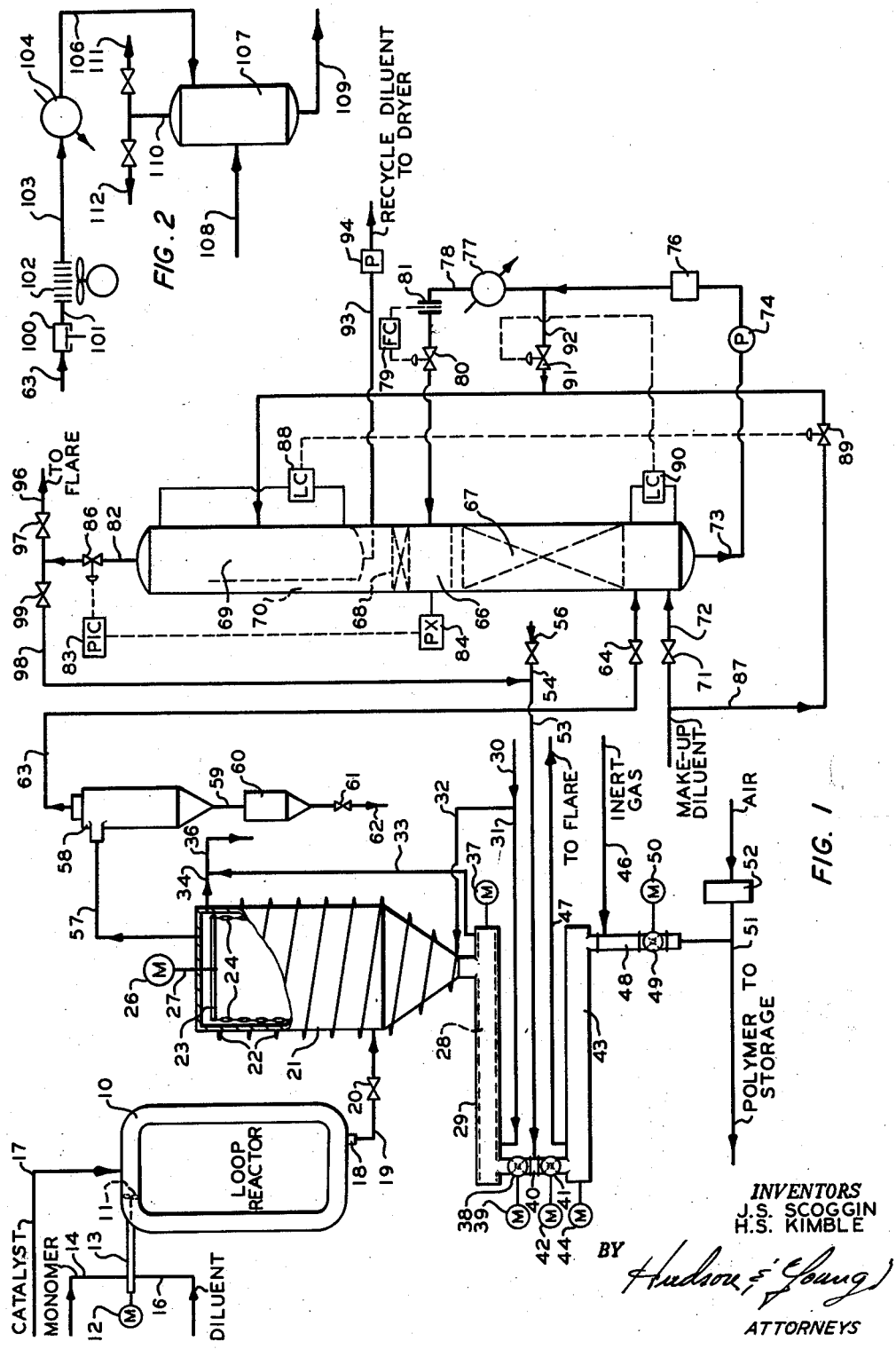

3,152,872
SEPARATION OF SOLID POLYMERS AND
LIQUID DILUENT
Jack S. Scoggin, Bartlesville, and Harvey S. Kimble, Tulsa, Okla., assignors to Phillips Petroleum Company, a corporation of Delaware
Filed Mar. 6, 1961, Ser. No. 93,758
11 Claims. (Cl. 34—15)

This invention relates to a method and apparatus for separating solid polymer and liquid diluent from a mixture of these materials. In another and more specific aspect the invention relates to a method and apparatus for separating solid polymer from liquid diluent, drying the polymer, and recovering the diluent for reuse in a polymerization process.

In many polymerization processes for the production of normally solid polymer a stream is formed which is a slurry of particulate polymer solids suspended in a liquid medium, ordinarily the reaction diluent. In a copending application of G. T. Leatherman and C. V. Detter, Serial No. 590,567, filed June 11, 1956, now abandoned, a process is disclosed for the polymerization of ethylene in a hydrocarbon diluent to form a slurry of non-agglomerating solids in the diluent. In this process or in other processes in which the polymer is prepared in solution and subsequently precipitated to form a slurry there exists a problem of separating the solid polymer from the liquid diluent. A convenient method is by flashing the hydrocarbon into vapor by reducing the pressure on the slurry. Ordinarily this method does not effect complete removal of the hydrocarbon from the polymer and the solids retain residual amounts of diluent which must be removed before the polymer can be handled in the atmosphere with safety. When the volatilized diluent is recovered, care must be exercised to prevent contaminating the diluent, thereby to avoid unnecessary purification steps before the hydrocarbon is reused in the polymerization process.

According to our invention a method and apparatus are provided for separating polymer solids from liquid hydrocarbon diluent which comprises evaporating the diluent from the mixture in a flash zone thereby forming a stream of polymer solids carrying residual diluent, passing the solids through a seal of hydrocarbon gas to a drying zone, contacting the solids with noncombustible gas in the drying zone thereby evaporating residual hydrocarbon diluent from the solids, and then conveying the thus dried polymer solids to a subsequent operation. The seal of hydrocarbon gas through which the solids are passed from the flash chamber to the drying zone prevents the noncombustible gas that is used to strip residual diluent from the solids from entering the flash chamber and contaminating the flashed diluent vapors. In this manner any readily available noncombustible gas, such as carbon dioxide or mixtures of carbon dioxide and nitrogen, can be employed to strip residual hydrocarbon from the polymer solids. The polymer thus dried can safely be introduced to a dryer or conveying system using air. The apparatus of our invention includes a flash chamber, means for feeding the slurry of polymer in liquid hydrocarbon to this chamber, a dryer, a conveyor connected to the lower portion of the flash chamber, a connecting conduit between said conveyor and said dryer, means for introducing hydrocarbon gas to said connecting conduit, means for introducing noncombustible gas to said dryer, and means for withdrawing noncombustible gas plus vaporized hydrocarbon from said dryer. In a still further aspect of our invention means and apparatus are provided for recovering the volatilized diluent by condensation in such a manner that condensed diluent is separated from uncondensed hydrocarbon vapor and gases, a portion of which is used to form the protective seal between the conveyor and the dryer.

It is an object of our invention to provide a method and apparatus for separating polymer solids from a hydrocarbon liquid diluent. Still another object is to provide a method and apparatus for separating solids from hydrocarbon diluent, drying the polymer solids and recovering the diluent for reuse in a polymerization process. Another object is to recover hydrocarbon diluent from a slurry of polymer in said diluent in such a manner that the diluent is not contaminated and can be used in a polymerization process with a minimum of purification. Still another object is to recover polymer solids from a slurry thereof in liquid hydrocarbon in such a manner that the solids can be conveyed in air without danger of fire. Another object of our invention is to provide apparatus which includes a flash chamber and means provided in that chamber to prevent the build-up of polymer deposits on the walls of said chamber. Other objects, advantages and features of our invention will be apparent to those skilled in the art from the following discussion and drawings in which:

FIGURE 1 is a schematic diagram showing the process for separating the polymer from diluent and recovery of the diluent according to our invention, particularly by condensing the diluent through contact with cooled liquid hydrocarbon, and FIGURE 2 illustrates schematically an alternate scheme whereby the vaporized diluent is condensed by compression and cooling.

The method and apparatus of our invention can be used in any process requiring a separation of polymer solids from a mixture of these solids in a liquid diluent. It is particularly significant where the diluent is an inflamable hydrocarbon which is recovered for reuse in a catalytic process. Many olefin polymerization processes produce such a slurry where a separation of this type is required. Of particular importance in this field are polymerization processes such as those described in the patent to Hogan et al., U.S. 2,825,721, issued March 4, 1958. Our invention is especially useful in a process such as that described in the above-mentioned copending application of Leatherman and Detter, since in such a process the reactor effluent is a suspension of solid particulate polymer in a liquid hydrocarbon diluent. In this process ethylene or mixtures of ethylene with other unsaturated hydrocarbons are contacted with a suspension of chromium oxide-containing catalyst in a liquid hydrocarbon diluent, the contacting occurring at a temperature such that substantially all of the polymer produced is insoluble in the diluent and in solid particle form, the particles being substantially non-tacky an non-agglutinative and suspended in the liquid diluent. The olefins employed are 1-olefins having up to 8 carbon atoms per molecule and no branching nearer the double bond than the 4-position. Examples of these materials include propylene, butene-1, 1-pentene, 1-octene, and 1,3-butadiene. The liquid hydrocarbon diluents which are suitable include paraffins having 3 to 12, preferably 3 to 8 carbon atoms per molecule, such as propane, n-butane, n-pentane, isopentane, n-hexane, isooctane and the like. Some naphthenes can be present in the diluent and mixtures of paraffins and isoparaffins can be employed. Naphthenic hydrocarbons having from 5 to 6 carbon atoms in a naphthenic ring which can be maintained in a liquid phase under the polymerization conditions can be employed such as cyclohexane, cyclopentane, methylcyclopentane, ethylcyclohexane, and the like. The temperature of the polymerization depends upon the hydrocarbon diluent chosen and is generally in the range of about 230° F. and below. The pressure of the reaction is sufficient to maintain the diluent in a liquid phase and is normally about 100 to 700 p.s.i.a. A slurry containing as high as 55 weight percent particulate polymer in the hydrocarbon diluent can be formed by this process and treated according to this invention.

To describe our invention further, reference is now made to the drawing, in which FIGURE 1 illustrates a schematic flow diagram and apparatus features of our invention. The polymerization is carried out in a loop reactor 10. The polymerization mixture is circulated by agitator 11 which is powered by motor 12, the shaft of the agitator passing into the loop reactor through conduit 13. Monomer and diluent are introduced through conduits 14 and 16, respectively, connected to conduit 13. Feed materials can be introduced at other points in reactor 10. In this embodiment catalyst is added through conduit 17 connected directly to reactor 10. Normally, catalyst is introduced as a suspension in hydrocarbon diluent. Very high ratios of polymer to catalyst can be formed by this process, for example, as high as 10,000 pounds of polymer per pound of catalyst. A slurry of polymer in the hydrocarbon diluent is formed within the reactor.

Polymer slurry is removed from the loop to a settling leg 18. The slurry then passes from settling leg 18 through conduit 19 and valve 20 into flash chamber 21. Chamber 21 is a vertically elongated vessel having a conical bottom section to facilitate removal of solid polymer particles. Vessel 21 is encircled by heat exchange coil 22 through which hot water or low pressure steam can be circulated to prevent heat loss from the flash vessel and increase the evaporation of hydrocarbon diluent from the polymer. In FIGURE 1 a portion of the wall of vessel 21 has been removed to show the interior of this vessel in which is positioned a rotatable support member 23 having attached thereto near the walls of the vessel a plurality of chains 24. These chains depend freely from support member 23 in contact with the walls of vessel 21 so that when support member 23 is rotated these chains rub against the wall of the flash chamber and thereby prevent polymer deposits from accumulating. Support member 23 which can be a disk, a wheel or a plurality of radial arms is rotated by motor 26 connected thereto by shaft 27. Solid polymers carrying residual amounts of diluent are removed from the bottom of flash chamber 21 and fall into auger conveyor 28. The conveyor is equipped with a jacket 29 through which hot water or other heat exchange fluid can be circulated. This hot water is passed from its source of supply through conduit 30 and is passed through conduits 31 and 32 to jacket 29 and heating coils 22, respectively. The hot water leaving jacket 29 is passed through conduit 33 to conduit 36 where it is joined by hot water in conduit 34 from coils 22 and returned to storage.

Conveyor 28 contains an auger which is powered by motor 37. As the polymer solids are moved by the auger additional diluent is evaporated because of the heat added from the hot water in jacket 29. These vapors pass into vessel 21. Polymer solids are conveyed to the end of this conveyor and passed through rotary valve 38 which is driven by motor 39. Polymer solids fall from rotary valve 38 through connecting conduit 40 and then through rotary valve 41 driven by motor 42. After passing through rotary valve 41 the solids drop into conveyor-dryer 43 which contains an auger driven by motor 44. As the polymer solids are passed through conveyor 43 they are contacted with heated noncombustible gas introduced through conduit 46. This gas can be any noncombustible gas which is readily available, such as carbon dioxide or nitrogen or mixtures of these gases, or the like. This gas passes through conveyor 43, contacts polymer solids while they are in motion and thereby evaporates residual amounts of hydrocarbon diluent from the polymer solids and also purges previously evaporated diluent. These gases with the evaporated diluent pass from conveyor 43 through conduit 47 and thence to a flare.

With the residual amount of hydrocarbon diluent removed, the polymer solids can be safely transferred to conveying means in contact with the atmosphere. As shown in FIGURE 1 the solids are dropped through discharge conduit 48, through rotary valve 49 driven by motor 50 into air conveyor 51. Air drawn through filter 52 sweeps the polymer solids through conveyor conduit 51 and thereby transfers the polymer to storage or subsequent operations such as packaging or pelleting. In order that the solids can be handled in air without danger of fire or creating a health hazard, it is essential that the hydrocarbon be removed in conveyor 43. The noncombustible gas strips hydrocarbon from the solids and sweeps hydrocarbon vapors away from rotary valve 49. The noncombustible gas which escapes past rotary valve 49 presents no problem.

It is important, however, that these gases do not escape past rotary valves 40 and 41 as they would then enter flash chamber 21 and contaminate the volatilized diluent which is to be recovered and recycled to the polymerization. In order to overcome this difficulty a hydrocarbon seal gas is introduced to connecting conduit 40 by way of conduit 53. The pressure of this hydrocarbon seal gas is maintained slightly greater than the pressure in either the conveyor dryer 43 or conveyor 28. Thus, any leakage through the rotary valves consists of the seal gas from connecting conduit 40 passing through valve 41 into conveyor dryer 43 where it is removed through conduit 47 to a flare, or through rotary valve 38 into conveyor 28 and thence into flash chamber 21. Since the seal gas is a hydrocarbon it does not contaminate the vaporized diluent. In one aspect of our invention this seal gas is hydrocarbon gases which are removed from the volatilized hydrocarbon diluent. Alternatively a hydrocarbon gas which is compatible with the polymerization process, for example ethylene, can be introduced through conduit 54 and valve 56 and passed through conduit 53 to connecting conduit 40.

The vaporized diluent in chamber 21 passes from the upper portion of this chamber through conduit 57 and enters the inlet of cyclone collector 58. Entrained polymer particles in the vapor stream are removed from the vapor in collector 58 and passed through conduit 59 into storage bin 60. The collected polymer can be removed from bin 60 by opening valve 61 in conduit 62 and disposed of in any desired manner. Hydrocarbon vapors having had polymer removed therefrom pass overhead from collector 58 through conduit 63 and valve 64 into washing tower 66.

Tower 66 is a composite tower consisting of a packed section 67, an entrainment separator 68, a liquid accumulator 69 and a vapor leg 70. Make-up liquid hydrocarbon diluent can be added to the bottom of tower 66 through valve 71 and conduit 72. The liquid is withdrawn from the bottom of tower 66 through conduit 73 and is passed by pump 74 through strainer 76, cooler 77 and conduit 78 to tower 66 above packed section 67. Any polymer fines carried over in the vapor from chamber 21 and not removed in cyclone collector 58 are removed in wash tower 66 and trapped in strainer 76. Refrigerant is passed in heat exchange relationship with the circulated liquid in cooler 77 and the cooled hydrocarbon diluent is passed through conduit 78 at a rate which is regulated by flow controller 79 operatively connected to motor valve 80 and orifice 81 in conduit 78. The cooled diluent enters the mid-point of tower 66 between packed section 67 and entrainment separator 68. The incoming hydrocarbon vapors in conduit 63 enter tower 66 just below packed section 67 and pass upwardly therethrough in countercurrent contact with the refrigerated liquid diluent. The hydrocarbon vapors are thus condensed and the uncondensed gases and vapors pass through entrainment separator 68 and upward through vapor leg 70 to the upper portion of tower 66 where they are removed through conduit 82. The pressure in the tower is regulated by pressure indicator controller 83 operatively connected to pressure transducer 84 connected to the mid-point of tower 66, and to motor valve 86 in conduit 82. Th make-up liquid diluent can also be passed through conduit 87 into accumulator 69 in the upper portion of tower 66. A minimum liquid level is maintained in vessel 69 by a level controller 88 connected to sense the liquid level in the lower portion of vessel 69 and operatively connected to motor valve 89 in conduit 87. The desired liquid level is maintained at the bottom of the tower 69 in the section below packing 67 by level controller 90 operatively connected to motor valve 91 in conduit 92. Conduit 92 connects conduit 73, which carries the recirculating diluent, and conduit 87 which is connected to accumulator 69. Thus condensed diluent with the contacting diluent is transferred to accumulator 69 where it is degassed, the vapors passing overhead through conduit 82. Liquid diluent is withdrawn from accumulator 69 through conduit 93 at a substantially constant rate by pump 94 and passed to reprocessing operations such as an alumina dryer, not shown, prior to being returned to the polymerization. The vapors and gases removed from the top of tower 66 can be passed through conduit 96 and valve 97 to a flare. In one aspect of our invention a portion of these gases is passed through conduit 98 and valve 99 via conduit 53 to connecting conduit 40. A supply of seal gas which will not contaminate the hydrocarbon diluent removed from flash chamber 21 is thereby provided.

Referring to FIGURE 2 an alternate embodiment is shown for condensing the hydrocarbon diluent in conduit 63. Vapor in conduit 63 enters compressor 100 and the compressed vapors are passed through conduit 101 to air-fin cooler 102 wherein a portion of the compressed vapors are condensed. The remaining vapors with the condensate are passed through conduit 103 to condenser 104 where most of the remaining vapors are condensed and the condensate is passed through conduit 106 to knockout drum 107. Make-up diluent is added by conduit 108 to knockout drum 107 where it is degassed and the recycled and make-up diluent is withdrawn from knockout drum 107 through conduit 109 and passed to the polymerization process. The uncondensed vapors and gases are removed overhead from knockout drum 107 and passed through conduit 110 and thence to a flare through conduit 111 or returned as seal gas in connecting conduit 40 by way of conduit 112. Hydrocarbon gases which are removed overhead from knockout drum 107 or washing tower 66 are predominantly diluent, normally gaseous monomers such as ethylene or other olefins employed in the polymerization which have boiling points below that of the diluent, and inert materials such as methane, ethane, and the like. These inert materials are introduced with the monomer and the diluent and by separation as described above are prevented from building up in the system even though substantial quantities of the diluent are recycled. Ordinarily a blower is required to transfer the hydrocarbon gases from the vent line to the connecting conduit 40 at the required pressure.

To illustrate our invention further, the following example is presented. The conditions and flow rates are presented as typical only and should not be construed to limit our invention unduly.

Ethylene at 630 pounds per hour, butene-1 at 45 pounds per hour and normal pentane at 685 pounds per hour are continuously fed to reactor 10 which is maintained at a temperature of 190° F. at a pressure of 465 p.s.i.a. Chromium oxide catalyst containing 2.5 weight percent chromium oxide on a 90/10 silica alumina support is fed to reactor 10 at a rate of 0.30 pound per hour. A slurry containing about 20 weight percent solids is formed in the reactor and concentrated in settling leg 18 to about 45 weight percent particulate ethylene-butene copolymer in normal pentane which is then passed in pulsating flow from settling leg 18 to flash chamber 21 operated at 3 p.s.i.g. and 150° F. Polymer solids containing about 12 weight percent residual pentane are passed through conveyor 28 and connecting conduit 40 into conveyor dryer 43. Carbon dioxide is introduced to dryer 43 at a rate of 27 pounds per hour and at a temperature of 150° F. This stripping gas with the residual pentane is passed through conduit 47 to a flare. Polymer solids at a rate of 635 pounds per hour are conveyed in an air stream to storage.

Vaporized hydrocarbons are passed from flash chamber 21 through gas cyclone 58 at a rate of 645 pounds per hour. Polymer solids are kept from building up on the wall of flash chamber 21 by the scraper chains on their support which rotates at a speed of 1 revolution per minute. Water at a temperature of 200° F. is circulated through the jacket of conveyor 28 and the coils 22 around flash chamber 21. The hydrocarbon vapor from cyclone 58 is passed to tower 66.

Refrigerated pentane at a temperature of 15° F. is circulated at a rate of 54.5 gallons per minute through conduit 78. This pentane passes over packing 67 in tower 66 and contacts vapors introduced below the packing. Uncondensed vapors and gases, predominantly ethylene, butene-1 and normal pentane, are removed overhead from tower 66 through conduit 82 at a rate of 53 pounds per hour and 22 pounds per hour of these gases are returned through conduits 98 and 53 to connecting conduit 40 to serve as seal gas between the flash chamber and the dryer. The remainder of this gas is passed to a flare. Normal pentane containing substantial amounts of ethylene and butene-1 dissolved therein is passed from accumulator 69 through conduit 93 at a rate of 595 pounds per hour to alumina dryers prior to being reintroduced into reactor 10.

As will be evident to those skilled in the art various modifications can be made in our invention without departing from the spirit and scope thereof.

We claim:

1. A method of recovering polymer solids from a polymerization effluent which is a slurry of said solids in liquid hydrocarbon diluent which comprises flashing hydrocarbon diluent from said slurry in a flash zone thereby forming a stream of hydrocarbon vapor and polymer solids carrying residual diluent, withdrawing flashed hydrocarbon vapors from said flash zone, contacting said vapors with relatively cool liquid hydrocarbon diluent to condense most of said vapors in a contacting zone, venting uncondensed hydrocarbon vapors and gases from said contacting zone, recirculating condensed hydrocarbon diluent with the contacting diluent to the polymerization process, passing said polymer solids from said flash zone to a drying zone by way of a connecting channel, maintaining an atmosphere of hydrocarbon gas within said connecting channel, passing at least a portion of the uncondensed material vented from said contacting zone to said connecting channel to provide said atmosphere, maintaining the pressure in said connecting channel slightly greater than the pressures in either said flash zone or said drying zone, contacting said polymer solids with noncombustible gas in said drying zone thereby evaporating residual hydrocarbon diluent from said solids, and conveying the thus dried polymer solids in an air stream to a subsequent operation.

2. A method of recovering polymer from a polymerization mixture thereof in liquid hydrocarbon diluent which comprises evaporating hydrocarbon diluent from said mixture in a flash zone thereby forming a stream of polymer solids carrying residual diluent and a stream of diluent vapor, recovering said diluent vapor for reuse in polymerization, passing said solids from said flash zone into a connecting zone and thence into a drying zone, valving the flow of solids between said zones, contacting said solids with noncombustible gas in said drying zone to evaporate residual hydrocarbon diluent, pressuring said connecting zone with hydrocarbon gas so that any gas leakage between said zones is from said connecting zone into the flash zone and drying zone, thus preventing the commingling of said noncombustible gas with said diluent vapor, and removing said solids from said drying zone.

3. The method of claim 2 wherein said hydrocarbon gas is monomer used in the polymerization for which said diluent is recovered.

4. Process according to claim 2 wherein said polymer is an ethylene polymer, said hydrocarbon diluent is normal pentane, and said noncombustible gas is predominantly carbon dioxide.

5. Apparatus suitable for separating liquid hydrocarbon from particulate polymer comprising, in combination, a vertically elongated flash vessel, means for feeding a slurry of said polymer in said liquid hydrocarbon to said vessel, a cyclone collector, a conduit connecting the upper portion of said flash vessel with the inlet of said collector, means for condensing hydrocarbon vapor connected to the gas outlet of said collector, means for separating condensed liquid from uncondensed gases positioned to receive material from said condensing means, said separating means having a gas outlet, an auger conveyor connected to said flash vessel and positioned to receive polymer solids from the lower portion of said vessel, an auger conveyor dryer, a connecting conduit linking said auger conveyor with said conveyor dryer, a rotary valve in each end of said connecting conduit, means for introducing hydrocarbon gas into said connecting conduit, means for introducing noncombustible gas into said conveyor dryer, means for withdrawing said noncombustible gas with evaporated hydrocarbon from said conveyor dryer, an air-stream conveyor, a discharge conduit connecting the outlet of said conveyor dryer with said air-stream conveyor, a rotary valve positioned within said discharge conduit, and conduit means connecting the gas outlet of said separating means with said means for introducing hydrocarbon gas to said connecting conduit.

6. The apparatus according to claim 5 wherein said condensing means comprises a compressor and a cooler.

7. The apparatus according to claim 5 wherein said condensing means comprises a contacting tower and means for introducing cooled hydrocarbon liquid to said tower.

8. The apparatus according to claim 5 wherein said condensing and separating means are combined in a tower having a lower packed section, an upper accumulator section, an inlet below said packed section connected to the gas outlet of said collector, means for passing fresh liquid hydrocarbon to below said packed section and to said accumulator section, means for circulating liquid from below to above said packed section and cooling said liquid en route, means for passing liquid from below said packed section to said accumulator section, a channel connecting the space above said packed section with the upper portion of said accumulator section, and a liquid outlet at the bottom of said accumulator section, said gas outlet being at the top of said accumulator section.

9. Apparatus suitable for separating liquid hydrocarbon from particulate polymer comprising, in combination, a vertically elongated flash vessel, means for feeding a slurry of said polymer in said liquid hydrocarbon to said vessel, means for withdrawing vapors from the upper portion of said vessel, conveying means connected to said vessel and positioned to receive polymer solids from the lower portion of said vessel, means for passing a heated fluid in indirect heat exchange relationship with said conveying means and said flash vessel, a conveyor dryer, a connecting conduit linking said conveying means with said conveyor dryer, valving means in each end of said connecting conduit, means for introducing hydrocarbon gas to said connecting conduit, means for introducing noncombustible gas to said conveyor dryer, means for removing noncombustible gas with evaporated hydrocarbon from said conveyor dryer, an air stream conveyor, a discharge conduit connecting said conveyor dryer with said air stream conveyor, and valving means in said discharge conduit.

10. Apparatus suitable for separating liquid hydrocarbon from particulate polymer comprising, in combination, a vertically elongated flash vessel, means for feeding a slurry of said polymer in said liquid hydrocarbon to said vessel, means for withdrawing vapors from the upper portion of said vessel, a rotatable support member positioned in the upper portion of said elongated flash vessel, a plurality of chains depending from said rotatable support member in contact with the vertical walls of said flash vessel, means for rotating said support member, conveying means connected to said vessel, and positioned to receive polymer solids from the lower portion of said vessel, a conveyor dryer, a connecting conduit linking said conveying means with said conveyor dryer, valving means in each end of said connecting conduit, means for introducing hydrocarbon gas to said connecting conduit, means for introducing noncombustible gas to said conveyor dryer, means for removing noncombustible gas with evaporated hydrocarbon from said conveyor dryer, an air stream conveyor, a discharge conduit connecting said conveyor dryer with said air stream conveyor, and valving means in said discharge conduit.

11. Apparatus suitable for separating liquid hydrocarbon from particulate polymer comprising, in combination, a flash vessel, means for feeding a slurry of said polymer in said liquid hydrocarbon to said vessel, means for withdrawing vapors from the upper portion of said vessel, conveying means connected to said vessel and positioned to receive polymer solids from the lower portion of said vessel, means for passing a heated fluid in indirect heat exchange relationship with said conveying means and said flash vessel, a conveyor dryer, a connecting conduit linking said conveying means with said conveyor dryer, means for introducing hydrocarbon gas to said connecting conduit, means for introducing noncombustible gas to said conveyor dryer, and means for removing noncombustible gas with evaporated hydrocarbon from said conveyor dryer.

References Cited in the file of this patent

UNITED STATES PATENTS

| | | |
|---|---|---|
| 2,259,487 | Payne | Oct. 21, 1941 |
| 2,716,289 | Lauck | Aug. 30, 1955 |
| 2,874,113 | Smith et al. | Feb. 17, 1959 |